United States Patent
Flexman et al.

(10) Patent No.: US 7,294,663 B2
(45) Date of Patent: Nov. 13, 2007

(54) COMPATIBILITY IMPROVEMENT IN AROMATIC POLYESTERS WITH MINERAL FILLERS

(75) Inventors: Edmund A. Flexman, Wilmington, DE (US); Mark Weinberg, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/659,888

(22) Filed: Sep. 11, 2003

(65) Prior Publication Data

US 2004/0115452 A1 Jun. 17, 2004

Related U.S. Application Data

(60) Provisional application No. 60/434,072, filed on Dec. 17, 2002.

(51) Int. Cl.
*C08K 3/10* (2006.01)

(52) U.S. Cl. .............. 524/413; 524/423; 524/425; 524/427; 524/430; 524/437; 524/442; 524/447; 524/492; 524/493; 524/497

(58) Field of Classification Search ........ 524/413, 524/423, 425, 427, 430, 437, 442, 447, 492, 524/493, 497
See application file for complete search history.

(56) References Cited

U.S. PATENT DOCUMENTS

| | | | |
|---|---|---|---|
| 2,768,994 A | 10/1956 | MacDonald | |
| 3,027,352 A | 3/1962 | Walling et al. | |
| 3,996,173 A | 12/1976 | Heichele | |
| 4,278,576 A | 7/1981 | Goldman | |
| 4,373,067 A * | 2/1983 | Dieck et al. ........... | 525/146 |
| 4,521,488 A | 6/1985 | Hattori et al. | |
| 4,598,117 A * | 7/1986 | Liu et al. ............... | 524/444 |
| 4,639,481 A * | 1/1987 | Giles, Jr. ............... | 524/128 |
| 4,692,480 A * | 9/1987 | Takahashi et al. ..... | 523/218 |
| 4,753,980 A | 6/1988 | Deyrup | |
| 4,804,716 A | 2/1989 | Flexman | |
| 4,992,506 A * | 2/1991 | McCormick et al. ... | 524/513 |
| 5,191,000 A * | 3/1993 | Fuhr et al. ............. | 524/117 |
| 5,399,608 A * | 3/1995 | Allen et al. ............ | 524/413 |
| 5,641,824 A | 6/1997 | Forschirm | |
| 6,268,418 B1 * | 7/2001 | Magerstedt et al. ... | 524/125 |
| 6,399,695 B1 * | 6/2002 | Moriwaki et al. ..... | 524/504 |

FOREIGN PATENT DOCUMENTS

| | | | |
|---|---|---|---|
| EP | 221 338 | | 5/1987 |
| EP | 655 320 | | 5/1995 |
| JP | 05-140428 | * | 6/1993 |
| WO | WO88/07064 | | 9/1988 |
| WO | WO02/14429 | | 2/2002 |

OTHER PUBLICATIONS

U.S. Appl. No. 10/660,435, Inventor(s): Edmund A. Flexman and Mark G. Weinberg, Title: Compatibility Improvement in Crystalline Thermoplastics With Mineral Fillers.
U.S. Appl. No. 09/641,149, Inventor(s): Edmund A. Flexman and Mark G. Weinberg, Title: Toughened, High-Modulus Polyamides.
Derwent Publications Ltd., XP002276832, JP 05 140428, Tonen Sekiyu Kagaku KK Jun. 1993.

* cited by examiner

*Primary Examiner*—Peter D. Mulcahy
(74) *Attorney, Agent, or Firm*—Kevin S. Dobson

(57) ABSTRACT

Liquid crystalline polymers (LCP) with relatively high melting points are prepared by a process which includes solid state polymerization of a (pre)polymer, which contains alkali metal cations, to raise the LCP molecular weight. The presence of the alkali metal cations in the (pre)polymer usually results in a final polymer with less color and/or a higher melting point. The LCPs are useful as molding resins and for films.

16 Claims, No Drawings

COMPATIBILITY IMPROVEMENT IN AROMATIC POLYESTERS WITH MINERAL FILLERS

This application claims the benefit of U.S. Provisional Application No. 60/434,072 filed Dec. 17, 2002 which is incorporated by reference herein for all purposes as if fully set forth.

CROSS REFERENCE

Cross reference is made to DuPont Application No. 60/434,070 entitled "Compatibility Improvement in Crystalline Thermoplastics with Mineral Fillers" being concurrently filed provisionally with the present application and is incorporated by reference.

FIELD OF THE INVENTION

The present invention relates to a crystalline thermoplastic composition that exhibits improved compatibility while maintaining or increasing desirable toughness. More particularly, the present invention relates to a composition comprising an aromatic polyester (such as polybutylene terephthalate (PBT) or polyethylene terephthalate (PET) or polypropylene terephthalate (PPT)) matrix material, mineral filler and elastomer.

BACKGROUND OF THE INVENTION

Crystalline thermoplastics such as aromatic polyesters are well known in the art, and are in widespread commercial use, principally in the form of PBT, PPT and PET.

Polymer-polymer blends of the prior art often comprise soft or elastomeric materials with a matrix resin to provide improved toughness. Sometimes this improved toughness is manifested by an increase in resistance to a notched impact, sometimes by an improvement in elongation or falling weight impact, and sometimes by an increased ability for the molded article to be bent without breaking. In order for the soft elastomeric material to toughen the polymer matrix, it must first be dispersed well and into small particles. The small particles must be maintained as small and discrete particles during any subsequent melt processing, such as injection molding. Finally, there must be sufficient adhesion in the solid state to allow energy from an impact or otherwise distorting event to cross the interface from the matrix to the elastomeric particles for them to toughen the part.

"Compatibility" is an old and broadly used term in polymer blend technology. The meaning of compatibility is often defined by the context in which it is used. Hence, compatibility can vary in meaning from compatible to the naked eye to chemically compatible in that one ingredient will not degrade the other such as could be the case with aromatic polyesters and primary amines for example, to being present in a blend at a high level without giving a delaminated injection molded article, to being miscible at the molecular level. For purposes of this application, the term "better or improved compatibility" is defined in the Definitions section of the Detailed Description.

Manufacturers and customers of aromatic polyester compositions and the articles made from these compositions are interested in lower cost and/or improved toughness associated therewith. Thus, it is desirable to provide aromatic polyester compositions (e.g. polymer blends) such as PBT, PPT and PET and articles with improved compatibility with economical polar olefins or using less of relatively expensive elastomers such as thermoplastic polyurethanes (TPUs) or polyether polyester thermoplastics.

The following disclosures may be relevant to various aspects of the present invention and may be briefly summarized as follows:

U.S. Pat. No. 4,753,980 to Deyrup discloses toughened thermoplastic polyester molding compositions characterized by extraordinary toughness comprising 60-97 weight % of a polyester matrix resin and 3-40 weight % of an ethylene copolymer such as ethylene/methylacrylate/glycidyl methacrylate.

U.S. Pat. No. 5,641,824 to Forschirm discloses a self-lubricating polymeric composition, characterized as a melt blend of a thermoplastic polymer and a lubricating system containing ultra high molecular weight polyethylenes, a polyester, acid metal salts, calcium salts, antioxidants and stabilizers. The composition may be prepared into shaped articles, which exhibit improved surface wear resistance and coefficients of friction.

SUMMARY OF THE INVENTION

Briefly stated, and in accordance with one aspect of the present invention, there is provided a composition comprising a composition for improved compatibility comprising (a) a matrix material of about 50% to 90% by weight of an aromatic polyester; (b) about 5% to 30% by weight of a mineral filler and (c) about 10% to 20% by weight of an elastomer.

Pursuant to another aspect of the present invention, there is provided a composition comprising a composition for improved compatibility comprising an aromatic polyester matrix material with about 5% to less than 30%, by weight of a mineral filler, the filler having an average equivalent spherical diameter in the range of 0.05 to less than 4 micrometers, said mineral filler being present in a ratio of about 0.5x to less than 1.5x by weight of the elastomer, the elastomer being in a ratio to the matrix resin of about 5 to 20% by weight.

Pursuant to another aspect of the present invention, there is provided an article made from a composition described in the preceding two paragraphs.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Definitions:

The following definitions are provided as reference in accordance with how they are used in the context of this specification and the accompanying claims.

1. Improved Compatibility: describes how mineral filler in a polymer blend helps improve toughness, which in the present invention are demonstrated by the Izod impact test.
2. Elastomer: is defined as a soft second phase polymer capable of toughening the aromatic polyester matrix under certain conditions.

3. For purposes of this application the following legend is provided showing the capital letter that coincides with the description of the materials used in the text and Examples contained herein:

| | |
|---|---|
| A | 0.7 microns precipitated calcium carbonate, 2 weight % stearic acid coating, manufactured by Specialty Minerals Inc., New York, NY. |
| B | Polybutylene terephthalate (PBT), with an IV of 1.19 at 0.4% by weight in a 1:1 by weight solution of TFA/MC (trifluoro acetic acid/methylene chloride) at 19° C. manufactured by E. I. du Pont de Nemours & Co of Wilmington, DE. |
| C | Ethylene/butylacrylate/glycidolmethacrylate terpolymer (EBAGMA), 67/28/5 weight %, melt index 15, manufactured by E. I. du Pont de Nemours & Co of Wilmington, DE. |

The present invention, through the incorporation of elastomers or polar olefins into aromatic polyester, along with mineral fillers, results in improvements in properties over the prior art polymers. The present invention discloses a ternary composition that includes an elastomer or polar olefin and a mineral filler in addition to the aromatic polyester matrix material (e.g. PBT (i.e. B in the above legend), PPT or PET), to improve compatibility including increasing the toughness of the polymer-polymer blend. The increase in toughness of the ternary composition is a surprising and unexpected result of the present invention. It is believed that the elastomeric material of the present invention, along with the mineral filler causes the desired increase in toughness of the present invention.

The polyesters of the present invention may include additives, including: stabilizers, antioxidants, mold release agents, lubricants, carbon black, plasticizers, pigments, nucleating agents, fire retardants, glass fibers, and other well-known additives commonly employed in the art.

In one embodiment of the present invention, the particulate solids such as CaCO3 or TiO2 are able to improve the "compatibility" of blends of two or more polymers. In the prior art, a binary blend containing mineral filler and a matrix of a crystalline thermoplastic polymer, improves both stiffness and toughness using a mineral filler, as described in WO 02/14429 to Weinberg et al. and U.S. Ser. No. 09/641, 149. The present invention improves compatibility and increases the toughness over that of a binary composition of aromatic polyesters and elastomers. This improved toughness of the present invention is believed to be a result of the particulate solid filler material, such as CaCO3 or TiO2, being encapsulated by the first phase to melt (usually the softer elastomer), and acting to increase the effective volume of rubber. In some instances, the rubber level of the aromatic polyester (i.e. PBT, PET, or PPT) composition may be reduced by using the mineral filler to replace a portion of the rubber (e.g. the total rubber volume is decreased while the density is increased) to achieve the desired toughness. In contrast, common binary elastomer/matrix blends usually exhibit decreased toughness when a mineral filler is added.

The composition, of the present invention, also reduces the cost without losing the desired properties (e.g. toughness) by using inexpensive mineral fillers rather than a higher level of a more expensive rubber toughener. Hence, leading to reduction in the cost of the composition. While the present invention is also applicable for other expensive elastomers such as polyether polyester thermoplastic elastomer, the economically-preferred elastomers of the present invention are soft ethylenic polymers such as ethylene vinyl acetate (EVA), ethylene methyl acrylate (EMA), ethylene vinyl acetate carbon monoxide (EVACO), ethylene butyl acrylate carbon monoxide (EBACO), and ethylene butyl acrylate glycidolmethacrylate (EBAGMA) or other soft ethylenic polymers. These soft ethylenic polymers may be copolymers, terpolymers or tetrapolymers.

As mentioned above, the term "better or improved compatibility" in the present invention is used to describe how a polymer blend helps improve toughness. It is believed that toughness is improved in the present invention because the improved compatibility can provide a composition with rubber particles that are able to toughen the composition better than simple rubber particles. The size of the rubber particles may be a factor. Rubber (e.g. elastomer) particles can be too small in some matrices, for instance in nylon 6 or traditional HIPS (high impact polystyrene). Particulate solids may enhance the ability of the rubber to cavitate. Particulate solids may also increase the melt viscosity of a molten polymer as in the dispersed rubber particles in a molten polymer blend. Thus, they may help prevent coalescence, which is recognized as a cause of large rubber particles, when the filler particles are mostly located in the rubber particles (i.e. encapsulated). It is further believed, that the present invention improves compatibility because the particulate solids, in acting like a rubber extender, increase the effective volume of the elastomer in the total system.

Suitable inorganic fillers for use in this invention are those that do not have significant off-gassing or decompose themselves or cause the polyester matrix to decompose at typical processing conditions, including the time-temperature combinations of injection molding. These include, but are not limited to: calcium carbonate; oxides such as alumina, silica, and titanium dioxide; sulfates such as barium sulfate; titanate; kaolin clay and other silicates; magnesium hydroxide, and carbon black. In the present invention, an aspect ratio (the average ratio of the largest to the smallest dimension of the filler particle) of less than about five (5) avoids stress concentrations and part anisotropies. The preferred fillers are calcium carbonate (CaCO3) and titanium dioxide (TiO2). Table 1 provides an example of a calcium carbonate mineral filler that is coated with stearic acid. (See A in the legend under the Definitions, #3.) These inorganic fillers can be coated or uncoated. In the present invention, it is believed that the coating helps the rubber to better toughen by allowing cavitation to occur within the rubber particle The size of the filler particles listed, in the legend of the Definitions section, #3, above, is their equivalent spherical diameter. The equivalent spherical diameter is the diameter of a sphere having the same volume as the filler particle and may be determined by use of a Sedigraph 5100 (Micrometrics Instrument Corporation, Norcross, Ga.). The Sedigraph 5100 determines particle size by the sedimentation method, measuring the gravity-induced settling rates of different size particles in a liquid with known properties. The rate at which particles fall through the liquid is described by Stokes' Law. The largest particles fall fastest, while the smallest particles fall slowest. The sedimentation rate is measured using a finely collimated beam of low energy X-rays that pass through the sample cell to a detector. The distribution of particle mass at various points in the cell affects the number of X-ray pulses reaching the detector. This X-ray pulse count is used to derive the particle size distribution expressed as the percent mass at given particle diameters. Since particles rarely exhibit uniform shapes, each particle size is reported as an "Equivalent Spherical Diameter", the diameter of a sphere of the same material with the same speed of sedimentation.

In the present invention, suitable particles have equivalent spherical diameters in the range of about 0.05 to less than about four (4) micrometers. The size of the filler particles can affect the toughness and/or stiffness properties of the composition of the invention. Particles that are either too large or too small do not produce the benefits of the present invention without causing other harmful effects. A suitable filler particle has a relatively narrow size distribution with particular emphasis on having a minimum number of particles much larger than the mean particle size. Another embodiment of the present invention is to blend together mineral fillers of different grades whose average particle size is within the equivalent spherical diameter range specified above.

The present invention is further illustrated by the following specific embodiments, which are not intended to be limiting thereon. Table 1 shows the resulting data on various weight % composition combinations of the present invention.

To attain the results in the Table that follows, the following experimental procedures were used. The fillers and resins were dried at 90° C. overnight prior to dry mixing. Melt blending was accomplished in a 30 mm co-rotating twin screw extruder (Werner & Pfleiderer, Ramsey, N.J.) at barrel temperatures of 260° C. and concentrations herein below specified in Table 1. The extrudate was pelletized. The extruded pellets were dried overnight at 90° C. and then processed in a 6 oz., 150 ton Van Dorn injection molding machine equipped with a water-heated mold, into dog-bone shaped tensile bars (Type I specimen, 2" (5.1 cm) long gauge length; ½" (1.3 cm) wide; ⅛" (0.38 cm) thick) and flexural test bars (5" (12.7 cm) long, ½" (1.3 cm) wide, ⅛" (0.38 cm) thick). The molding machine barrel temperatures were set at 260° C. and the mold temperature was set at 90° C. For Izod testing, the injection molded flexural test bars were divided into two 2½" (6.35 cm) long pieces, one close to the gate and referred to as the "near end" and the other far from the gate and referred to as the "far end". Notches of root radius 0.01" (0.03 cm) were cut into each part with a TMI Notching Cutter according to the specifications of ASTM D256. The impact response was studied in notched Izod impact tests according to ASTM D256. The Izod tests were calculated as averages over six individual measurements. The Izod values in the Tables are in terms of ft-lb./in with the J/m value in parentheses. (The conversion to J/m used was 53.4 J/M=1 ft-lb/in.)

Table 1 illustrates an embodiment of the present invention with PBT as the matrix (e.g. B) and filler (i.e. A) and rubber (i.e. C) added to toughen the composition. To magnify the effect, the rubber level in these examples is lower than is normally used commercially for PBT. The ternary combination of elastomer, filler material (e.g. calcium carbonate) and PBT (polybutylene terephthalate) improves compatibility (e.g. shown by the increasing toughness (e.g. Izod)) over the binary polymer blends of, for example: aromatic polyesters (which include PBT, PPT and PET) and rubber or elastomeric material. Examples of PPT and PET, as matrix materials for the present invention, are not shown but are also believed to improve compatibility over binary polymer blends.

Table 1 shows that as the filler increases, the Izod toughness increases as well. However, there appears to be an optimum filler-to-rubber ratio. At the low filler-to-rubber ratio of 0.5 (Example No. 2), the toughness is the same as the control (Example No. 1), given the standard deviations of the examples. Nonetheless, this result is economically valuable because it allows the replacement of expensive matrix resin or rubber with inexpensive filler, while maintaining toughness. At the higher filler-to-rubber ratio of 1.0 (Example No. 3), the Izod toughness is a maximum. At a filler-to-rubber ratio of 1.5 (Example No. 4), the Izod value is much lower than the control. Accordingly, this result is believed to indicate that the filler-to-rubber ratio of 1.5 provides the upper limit of improved toughness of this ternary composition.

TABLE 1

| Example No. | Wt. % | MATRIX | Wt. % | RUBBER | Wt. % | Mineral Filler | Filler/ Rubber Ratio | Sample Average IZOD Ft-lb/in (J/m) | Standard Deviation Izod Ft-lb/in (J/m) |
|---|---|---|---|---|---|---|---|---|---|
| Control 1 | 90 | B | 10 | C | 0 | | 0 | 9.5 (507) | 0.4 (19) |
| 2 | 85 | B | 10 | C | 5 | A | 0.5 | 9.1 (486) | 0.5 (27) |
| 3 | 80 | B | 10 | C | 10 | A | 1.0 | 10.4 (555) | 0.7 (39) |
| 4 | 75 | B | 10 | C | 15 | A | 1.5 | 4.5 (240) | 2.7 (143) |

It is therefore, apparent that there has been provided in accordance with the present invention, aromatic polyester (e.g. PBT, PET and PPT) ternary compositions containing a mineral filler and an elastomer that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A composition comprising (a) a matrix material of about 50% to 90% by weight of an aromatic polyester; (b) about 5% to 30% by weight of a mineral filler having an equivalent spherical diameter of about 0.05 to less than 4 micrometers and (c) about 10% to 20% by weight of an elastomer comprising thermoplastic polyurethane (TPU); polyether polyester thermoplastic polymers; an ethylene-methyl methyl acrylate (EMA) polymer; an ethylene-butyl acrylate carbon monoxide (EBACO) polymer; an ethylene-vinyl acetate carbon monoxide (EVACO) polymer; or an ethylene-butyl acrylate glycidolmethacrylate polymer (EBAGMA), wherein the weight percentages are based on the total weight of the composition.

2. A composition according to claim 1, wherein said aromatic polyester is selected from the group consisting of polybutylene terepthalate (PBT), polyethylene terephthalate (PET), and polypropylene terephthalate (PPT).

3. A composition according to claim 1, wherein the mineral filler is selected from the group consisting of calcium carbonate (CaCO3), oxides, sulfates, titanates, kaolin clay, silicates, magnesium hydroxide, carbon black and combinations thereof.

4. A composition according to claim 3, wherein the oxides are selected from the group consisting of aluminum oxides, silicon oxides, and titanium dioxide (TI02).

5. A composition according to claim 3, wherein the sulfates are barium sulfates.

6. A composition according to claim 3, wherein the mineral filler is CaCO3.

7. A composition according to claim 4, wherein the mineral filler is Ti02.

8. A composition according to claim 1, wherein the matrix material is a homopolymer.

9. A composition according to claim 3, wherein said mineral filler contains a coating, said coating being a non-aromatic organic acid, a salt, ester, ether, epoxy, or a mixture thereof.

10. A composition comprising an aromatic polyester matrix material with about 5% to less than 30%, by weight of a mineral filler, the filler having an average equivalent spherical diameter in the range of 0.05 to less than 4 micrometers, and about 5% to 20% by weight of an elastomer, relative to the total amount of elastomer and polyacetal, said mineral filler being present in a ratio of about 0.5× to less than 1.5× by weight of the elastomer, wherein the elastomer comprises thermoplastic polyurethane (TPU); polyether polyester thermoplastic polymers; an ethylene-methyl acrylate (EMA) polymer; an ethylene-butyl acrylate carbon monoxide (EBACO) polymer; en ethylene-vinyl acetate carbon monoxide (EVACO) polymer; or an ethylene-butyl acrylate glycidolmethacrylate polymer (EBAGMA).

11. A composition according to claim 10, wherein said aromatic polyester is selected from the group consisting of polybutylene terepthalate (PBT), polyethylene terephthalate (PET), and polypropylene terephthalate (PPT).

12. A composition according to claim 10, wherein the mineral filler is selected from the group consisting of calcium carbonate (CaCO3), oxides, sulfates, titanates, kaolin clay, silicates, magnesium hydroxide, carbon black and combinations thereof.

13. A composition according to claim 12, wherein the oxides are selected from the group consisting of aluminum oxides, silicon oxides, and titanium dioxide (Ti02).

14. A composition according to claim 10 or 12, wherein the mineral filler has a coating of a non-aromatic organic acid, a salt, ester, ether, epoxy, or a mixture thereof, at a concentration of at least 1% by weight of the mineral fillet.

15. A composition for according to claim 1, wherein said aromatic polyester is about 75% to 90% by weight; said mineral filler is about 5% to less than 15% by weight of mineral filler and said elastomer is about 10% by weight wherein the weight percentages are based on the total weight of the composition.

16. An article made from a composition according to any one of claims 1, 2, 3-11, 12, 13 or 15.

* * * * *